US012575472B2

(12) United States Patent
Dhobale et al.

(10) Patent No.: US 12,575,472 B2
(45) Date of Patent: Mar. 17, 2026

(54) ROW UNIT OVERLAP AVOIDANCE SYSTEM AND METHOD

(71) Applicant: DEERE & COMPANY, Moline, IL (US)

(72) Inventors: Dnyanesh K. Dhobale, Parbhani (IN); Elijah B. Garner, Bettendorf, IA (US); Andrew W. Harmon, Geneseo, IL (US)

(73) Assignee: Deere & Company, Moline, IL (US)

( * ) Notice: Subject to any disclaimer, the term of this patent is extended or adjusted under 35 U.S.C. 154(b) by 897 days.

(21) Appl. No.: 17/836,544

(22) Filed: Jun. 9, 2022

(65) Prior Publication Data

US 2023/0397522 A1 Dec. 14, 2023

(51) Int. Cl.
*A01B 69/08* (2006.01)
*A01B 69/00* (2006.01)
*A01C 5/06* (2006.01)

(52) U.S. Cl.
CPC .......... *A01B 69/006* (2013.01); *A01B 69/003* (2013.01); *A01B 69/007* (2013.01); *A01C 5/064* (2013.01)

(58) Field of Classification Search
CPC ....... A01B 69/006; A01B 49/04; A01B 79/02; A01B 69/007; A01B 49/02; A01B 21/086; A01B 21/083; A01B 15/14; A01B 13/14; A01B 11/00; A01B 5/08; A01B 79/06;

(Continued)

(56) References Cited

U.S. PATENT DOCUMENTS 3,175,522 A * 3/1965 Garber .................. A01C 5/064
                                                    172/240
6,135,484 A * 10/2000 Lauronen ............... B62D 13/02
                                                    280/445

(Continued)

FOREIGN PATENT DOCUMENTS

EP          3223595 B1 * 1/2022 ............. B62D 13/04

OTHER PUBLICATIONS

Virkar; Website: https://virkargroup.com/en/ocean/; Date: Jun. 13, 2022; pp. 1-9.

(Continued)

*Primary Examiner* — Christopher J Sebesta
*Assistant Examiner* — Blake E Scoville
(74) *Attorney, Agent, or Firm* — Taft Stettinius & Hollister LLP; Stephen F. Rost

(57) ABSTRACT

An agricultural planting system comprises an implement configured to be coupled to a work machine, row units of the implement, and first and second pairs of wheels configured to pivot and rotate to facilitate a turning operation during forward travel of the planting system. The row units are arranged in first and second ranks depending on their forward-aft placement. Furrow openers of the first rank of row units are configured to contact the ground along a first contact line, and furrow openers of the second rank of row units are configured to contact the ground along a second contact line. During a turning operation, the implement turns about a turning center axis, and the first and second pairs of wheels pivot in opposite directions, which allows the first and second contact lines to remain equidistant from the turning center axis during the turn.

19 Claims, 11 Drawing Sheets

(58) Field of Classification Search
  CPC ....... A01B 69/003; A01B 49/06; A01B 59/04;
              A01C 5/064; A01C 7/006; A01C 7/208
  See application file for complete search history.

(56)                    References Cited

U.S. PATENT DOCUMENTS

| | | | | |
|---|---|---|---|---|
| 7,540,522 | B2 * | 6/2009 | Friggstad | A01B 69/006 |
| | | | | 280/445 |
| 8,626,408 | B1 | 1/2014 | Satzler et al. | |
| 11,297,760 | B2 * | 4/2022 | Engel | A01C 7/06 |
| 2007/0108730 | A1 * | 5/2007 | Friggstad | B62D 13/025 |
| | | | | 280/444 |
| 2013/0255974 | A1 * | 10/2013 | Scherman | A01B 69/004 |
| | | | | 172/1 |
| 2016/0113190 | A1 * | 4/2016 | Scherman | A01B 69/005 |
| | | | | 172/1 |
| 2019/0249818 | A1 * | 8/2019 | Sheppard | A01C 7/06 |
| 2020/0344942 | A1 * | 11/2020 | Engel | A01C 5/064 |
| 2021/0127541 | A1 * | 5/2021 | Goering | A01C 5/06 |

OTHER PUBLICATIONS

Extended European Search Report and Written Opinion issued in European Patent Application No. 23178086.7, dated Nov. 15, 2023, in 11 pages.

* cited by examiner

ROW UNIT OVERLAP AVOIDANCE SYSTEM AND METHOD

FIELD OF THE DISCLOSURE

The present disclosure relates to systems and methods for row units of agricultural implements, and more particularly to systems and methods for arranging and moving wheels of the agricultural implement to prevent the row units from crossing paths during implement operation.

BACKGROUND

Conventional agricultural machines, in particular agricultural machines such as planters, include a main frame and row units coupled directly or indirectly to the main frame. Row units for planting seed and/or delivering fertilizer may include opener disks for forming furrows or rows in the soil to deposit the seed and/or fertilizer.

Certain crops require more narrow spacing than the row units can be spaced apart. To achieve this narrow row spacing, the row units can be split into multiple ranks which are separated from each other in the fore-aft direction. This may deepen the frame, or in other words, cause the frame to extend further in the fore-aft direction. With multiple ranks of row units, the lateral distance between the rows may vary greatly, especially during a turning operation.

The varying distance between rows can cause many problems. For example, overlap may be created with fertilizer intended to be delivered to separate locations; yield penalizing competition may result from seeds planted too closely together; and an increase in weeds may result in certain areas that are devoid of seed or fertilizer due to increased lateral spacing between the rows.

Therefore, what is needed is a system and method for maintaining constant lateral spacing between rows even during a turning operation of the agricultural machine and/or agricultural implement.

SUMMARY

In an illustrative embodiment, an agricultural planting system, comprises: an implement configured to turn about a turning center axis during forward travel of the planting system, the implement including: (i) a main frame and (ii) a plurality of row units each having a furrow opener configured to contact the ground; a first pair of wheels configured to support the main frame above the ground and a second pair of wheels positioned forward of the first pair of wheels; wherein the plurality of row units includes a first rank of row units and a second rank of row units arranged forward of the first rank of row units; wherein the furrow openers of the first rank of row units are configured to contact the ground along a first contact line; wherein the furrow openers of the second rank of row units are configured to contact the ground along a second contact line; wherein the first contact line and the second contact line each extend substantially parallel to at least one tool bar of the implement, the at least one tool bar fixedly coupled to the main frame; and wherein the first contact line and the second contact line are spaced apart equally from the turning center axis as the implement turns about the turning center axis.

In some embodiments, the implement includes at least one additional tool bar that is pivotably coupled to the main frame; and wherein the plurality of row units includes a third rank of row units coupled to the at least one additional tool bar.

In some embodiments, the first pair of wheels and the second pair of wheels are each steerable such that the first pair of wheels is configured to pivot in a first direction while the second pair of wheels pivots in a second direction opposite the first direction to cause the implement to turn about the turning center axis. In some embodiment, each wheel of the first pair of wheels and each wheel of the second pair of wheels includes a radial center point; and as the implement turns about the turning center axis, wheel-intersection lines are defined, which each: (i) pass through the radial center point of a respective wheel and through the turning center axis and (ii) extend perpendicular to a cross section taken along a circumference of the respective wheel.

In some embodiments, the planting system further comprises a tractor coupled to the implement and pivotable relative to the main frame of the implement; wherein the tractor includes the second pair of wheels and the implement includes the first pair of wheels. In some embodiment, the planting system further comprises a tractor coupled to the implement and pivotable relative to the main frame of the implement; wherein the implement includes the first pair of wheels and the second pair of wheels.

In some embodiments, the at least one tool bar includes a first tool bar and a second tool bar; the first rank of row units is coupled to the first tool bar; and the second rank of row units is coupled to the second tool bar. In some embodiments, the main frame includes: a forward portion to which the first tool bar is fixedly coupled; a rearward portion to which the second tool bar is fixedly coupled; and the forward portion of the main frame is pivotable relative to the rearward portion of the main frame. In some embodiments, the implement includes a third tool bar that is pivotably coupled to the main frame; and the plurality of row units includes a third rank of row units coupled to the third tool bar. In some embodiments, first tool bar and the second tool bar are each positioned between the first pair of wheels and the second pairs of wheel in a forward-aft direction.

In some embodiments, the at least one tool bar includes a first tool bar; and the first rank of row units and the second rank of row units are each coupled to the first tool bar. In some embodiments, the implement includes a second tool bar that is pivotable relative to the main frame; and the plurality of row units includes a third rank of row units coupled to the second tool bar. In some embodiments, the first tool bar is positioned between the first pair of wheels and the second pair of wheels in the forward-aft direction.

In some embodiments, as the implement turns about the turning center axis, the first contact line and the second contact line are equidistant from a longitudinal axis defined through a radial center of an axle to which the first pair of wheels is rotatably coupled. In some embodiments, the at least one tool bar includes a first tool bar and a second tool bar; the first rank of row units is coupled to the first tool bar; and the second rank of row units is coupled to the second tool bar. In some embodiments, the at least one tool bar includes a first tool bar; and the first rank of row units and second rank of row units are each coupled to the first tool bar.

In some embodiments, the implement includes at least one additional tool bar that is pivotably coupled to the main frame; and the plurality of row units includes a third rank of row units coupled to the at least one additional tool bar.

In another illustrative embodiment, an implement configured to turn about a turning center axis during forward travel of the planting system includes: a main frame comprising: (i) first portion having a first tool bar fixedly coupled thereto and (ii) a second portion arranged rearward of the first portion and having a second tool bar fixedly coupled thereto; a first rank of row units coupled to the first tool bar and each having a furrow opener configured to contact the ground; a second rank of row units coupled to the second tool bar and each having a furrow opener configured to contact the ground; and a forward pair of wheels coupled to the first portion of the main frame and a rearward pair of wheels coupled to the second portion of the main frame; wherein the first portion of the main frame is pivotably coupled to the second portion of the main frame.

In another illustrative embodiment, a method of turning an implement of a planting system about a turning center axis during forward travel of the planting system through a turn comprises: pivoting a first pair of wheels of the planting system in a first direction; simultaneously to pivoting the first pair of wheels in the first direction, pivoting a second pair of wheels in a second direction opposite the first direction; and simultaneously to pivoting the first pair of wheels in the first direction, maintaining ground contact with a first rank of row units coupled to the main frame and a second rank of row units coupled to the main frame, the second rank arranged forward of the first rank.

In some embodiments, pivoting the second pair of wheels in a second direction opposite the first direction includes: maintaining a first contact line and a second contact line equidistant from the turning center axis during a portion of the turn, the first contact line defined through ground engaging portions of the first rank of row units, and the second contact line defined through ground engaging portions of the second rank of row units.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
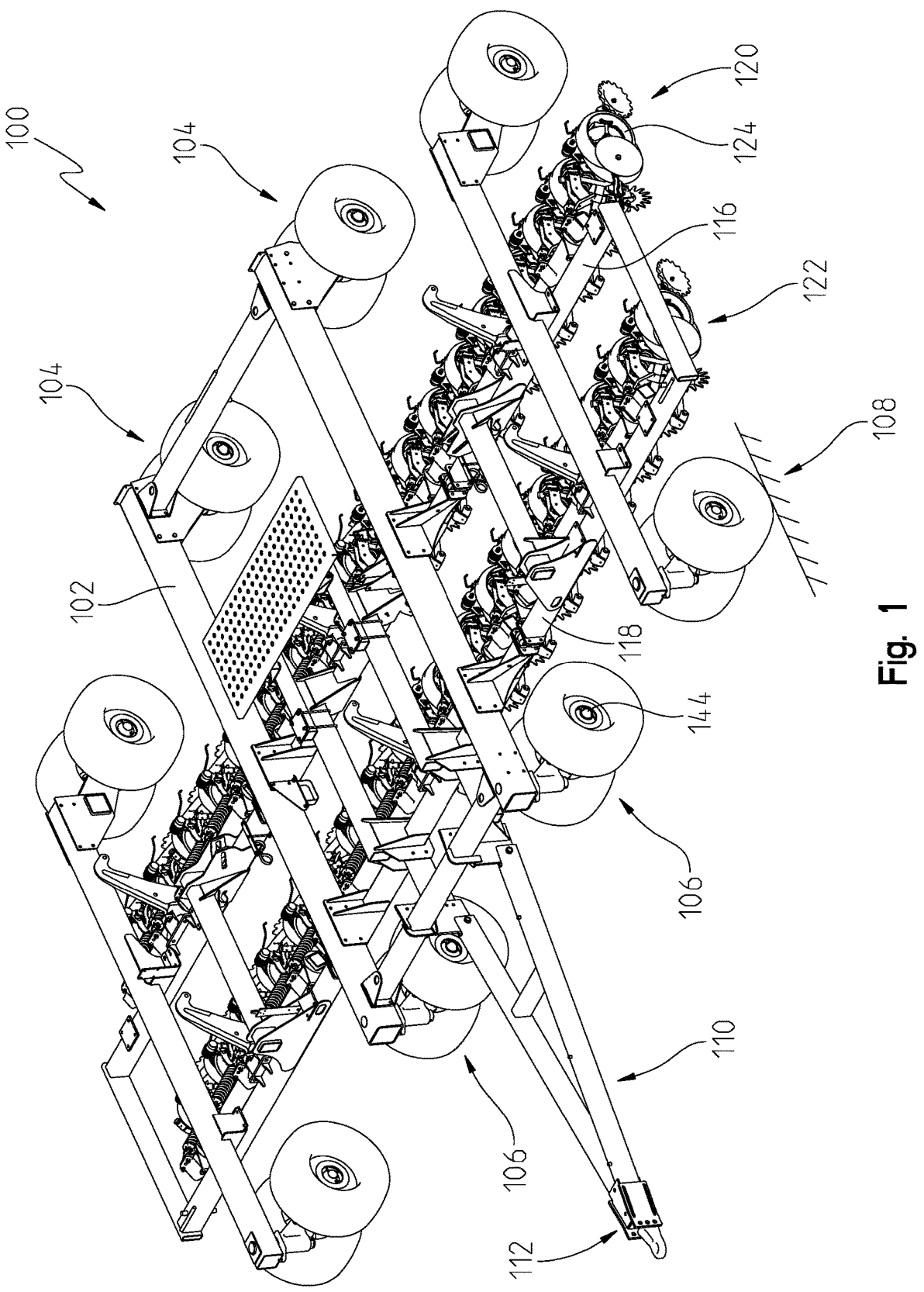
FIG. 1 is a front-side perspective view of an agricultural implement having row units.

Referring to FIG. 1 of the present disclosure, an agricultural implement or implement 100 is shown. The implement 100 may have one or more interconnected frame members fixedly coupled to one another to provide a main frame 102. The main frame 102 may have one or more ground engaging mechanisms 104, 106 (e.g., wheels or tracks) rotationally coupled thereto to allow the implement 100 to travel along the ground 108. Further, the implement 100 may include a tow bar or tongue 110 having a latch 112 that is configured to couple the implement 100 to a work machine such as a tractor.

In the illustrative embodiment, the implement 100 includes a first pair of wheels 104 pivotably coupled to the main frame 102 and a second pair of wheels 106, which are also pivotably coupled to the main frame 102. The second pair of wheels 106 are positioned forward of the first pair of wheels 104. Each wheel 104, 106 includes a radial center point 144 about which it rotates. While in the illustrative embodiment of FIG. 1 the first and second pair of wheels 104, 106 include castering wheels configured to follow a work machine as it moves forward, it should be appreciated that in other embodiments the first and/or second pair of wheels 104, 106 may be steerable. For example, the wheels 104, 106 may be steered by an operator of the implement 100 or automatically. In some embodiments, while each pair of wheels is steerable, the second pair of wheels 106 is actively steerable and the first pair of wheels 104 is passively steerable (i.e., synced to the second pair of wheels 106) such that the first pair of wheels 104 turns simultaneously with and the same degree of rotation (relative to the main frame 102) as the second pair of wheels 106. In other embodiments, the pairs of wheels 104, 106 may be steerable with differing degrees of rotation relative to the main frame 102. While certain figures herein show only a first and second pair of wheels, it should be appreciated that this disclosure applies to agricultural machines having additional wheels spaced laterally across an implement as well.

In some embodiments, when steered, the first pair of wheels 104 is configured to pivot relative to the main frame 102 in a first direction while the second pair of wheels 106 pivots relative to the main frame 102 in a second direction opposite the first direction. Such an embodiment mitigates variation in row spacing during a turning operation of the implement 100. Oppositely steerable pairs of wheels will be described in more detail with reference to other figures herein.

Referring still to FIG. 1, the implement 100 includes a plurality of row units 124 that are indirectly coupled to the main frame 102. To that point, the implement 100 includes a first tool bar 116 and a second tool bar 118 positioned forward of the first tool bar 116. In the illustrative embodiment, a first rank 120 of row units 124 is coupled to the first tool bar 116 and a second rank 122 of row units 124 is coupled to the second tool bar 118. In other embodiments, the first and second ranks 120, 122 may be coupled indirectly to the main frame 102 via other components and in different arrangements, which are described herein. Each arrangement described herein is carefully designed, differently from conventional implements, in order to mitigate variation in row spacing during a turning operation of the implement.

Figure 2:
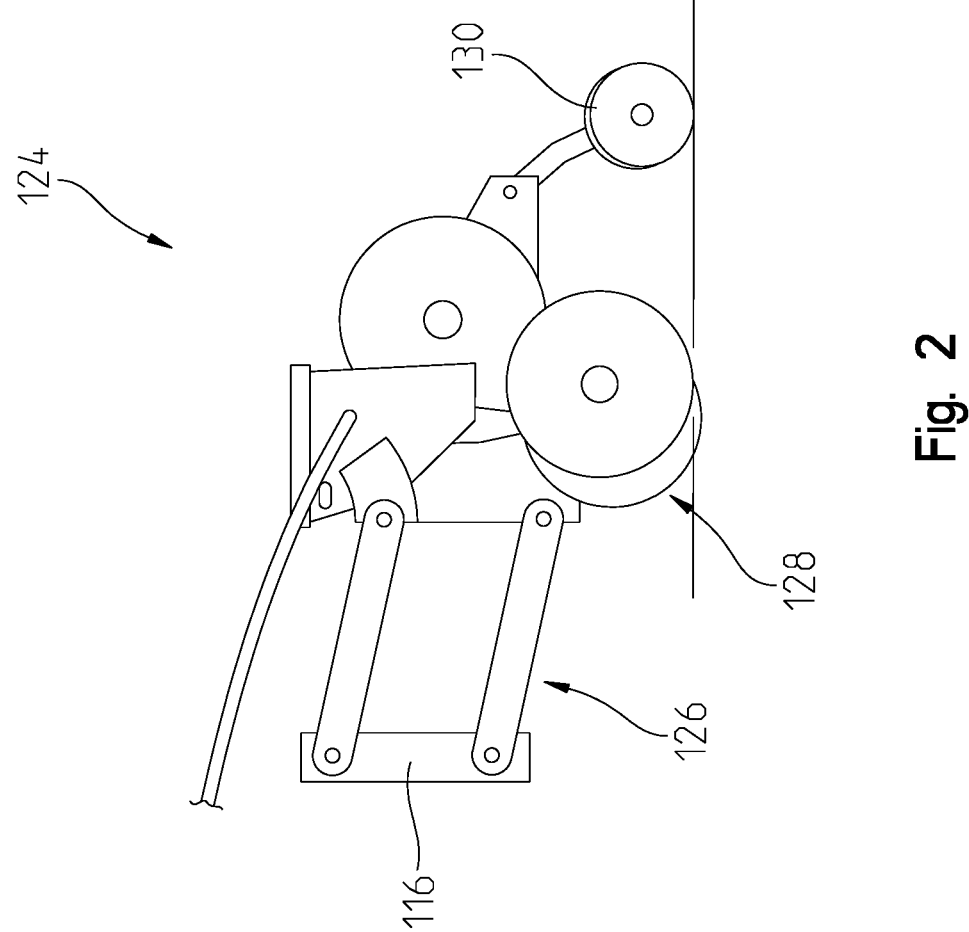
FIG. 2 is a side view of a row unit having a furrow opener.

FIG. 2 shows an exemplary row unit 124. The row unit 124 may include a row unit frame attached to the tool bar (e.g., tool bar 116) by a linkage assembly 126 including parallel arms. The linkage assembly 126 may allow vertical movement of the row unit 124 relative to the tool bar to follow ground contours. In an illustrative embodiment, the row unit frame supports a furrow opener 128. The furrow opener may be a single or double disc type furrow opener as shown in FIG. 2, a shank, or any other suitable opener for forming a furrow in the ground. The row unit 124 may also include one or more closing mechanisms 130, illustratively shown as closing discs, that follow behind the furrow opener 128 to push soil back into the furrow after the seed or other commodity is deposited therein. The row unit 124 may be configured to work with any type of commodity distribution system. In one example, the row unit 124 is part of an air seeder system that distributes commodity into the furrow created by the furrow opener 128 through an air flow system and conduit. In another example, the row unit 124 is configured to work with grain drill configurations that distribute commodity to the opening through a conduit.

The row unit 124 (or any other type of row unit configured to distribute seed, fertilizer, or other commodity) may be included in the first rank 120 and/or the second rank 122. As described herein, in some embodiments, an implement may include a third rank 132 of row units, which may also include the row unit 124 or any other type of row unit configured to distribute seed, fertilizer, or other commodity. While the third rank 132 is shown in herein as positioned forward of the first and second ranks 120, 122, it should be appreciated that the third rank 132 may be also be positioned rearward of the first and second ranks 120, 122. In some embodiments, the ranks 120, 122, 132 may each include the same type of row units, and in other embodiments, one or more of the ranks 120, 122, 132 may include different types of row units from each other. In some embodiments, one or more of the ranks 120, 122, 132 may include row units arranged to be pulled by a tool bar as an implement moves in the forward. In other embodiments, one or more of the ranks 120, 122, 132 may include row units arranged to be pushed by a tool bar as an implement moves in the forward.

Regardless of the type or orientation of the row units within a rank, each rank is defined by the characteristic that the row units of the rank each include furrow openers 128 configured to contact the ground along a contact line. It should be appreciated that due to uneven ground or wear and tear of an implement, the furrow openers 128 may not contact the ground along a truly straight line; in other words, some furrow openers 128 may contact the ground a trivial distance forward or aft of other furrow openers 128 in the rank. Therefore, the contact line may be a best fit line approximating the point of contact of each furrow opener 128 in the rank. In some embodiments, the contact line is parallel to the tool bar to which the rank is coupled. While recited as parallel, it should be appreciated that a contact line may only be substantially parallel to the corresponding tool bar because a contact line, especially a best fit contact line, may be angled a trivial degree relative to the tool bar rather than truly parallel thereto for the reasons described above.

Figure 3:
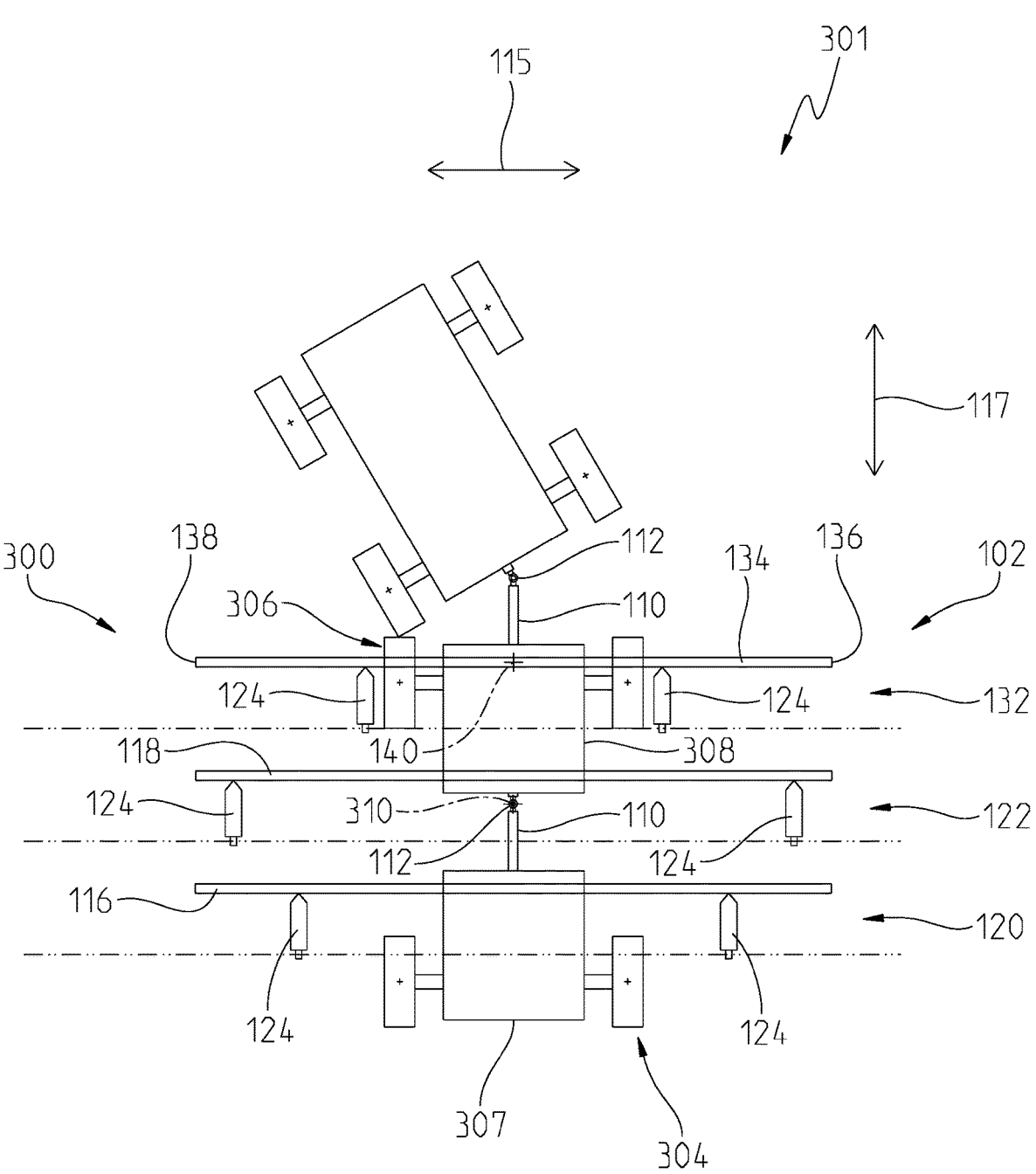
FIG. 3 is a diagrammatic view of an implement having row units and a main frame, which includes a first portion and second portion pivotably coupled to the first portion, where first and second tool bars are coupled respectively to the first and second portions of the main frame, and first and second ranks of row units are coupled respectively the first and second tool bars.

Referring now to FIG. 3, a planting system 301 is shown. In the illustrative embodiment, the planting system 301 includes an implement 300 and a work machine (not shown). While difference exist between the implement 300 and the implement 100, the implement 300 includes certain components and arrangements of the implement 100. As such, like components between embodiments herein will be referred to with like reference numbers. For example, the implement 300 includes the main frame 102 formed of a plurality of frame members and a plurality of row units 124 indirectly coupled to the main frame 102. The implement 300 also includes a first tool bar 116 and a second tool bar 118, each fixedly coupled to the main frame 102 and extending in the lateral direction 115, as shown in FIG. 3.

The implement 300 includes a first pair of wheels 304 and a second pair of wheels 306 coupled to the main frame 102. In the illustrative embodiment, the first and second pairs of wheels 304, 306 are not steerable, and as such, the first and second pairs of wheels 304, 306 are configured to pivot relative to the main frame 102 as the implement 300 follows a work machine. The main frame 102 includes a first portion 307 to which the first pair of wheels 304 are coupled and second portion 308 to which the second pair of wheels 306 are coupled. The second portion 308 is pivotably coupled to the first portion 307 (e.g., by the tongue 110 and latch 112 components) and positioned forward thereof. In the illustrative embodiment, the first portion 307 is pivotable relative to the second portion 308 about the pivot axis 310. In the illustrative embodiment, the first rank 120 of row units 124 is coupled to the first tool bar 116, which is coupled to the first portion 307 of the main frame 102, and the second rank 122 of row units 124 is coupled to the second tool bar 118, which is coupled to the second portion 308 of the main frame 102.

In the illustrative embodiment, the implement 300 includes a third tool bar 134 that is pivotably coupled to the main frame 102 at a pivot axis 140. The third tool bar 134 is pivotable relative to the main frame 102 about the pivot axis 140 such that first and second ends 136, 138 of the third tool bar 134 are moveable in the forward-aft direction 117 relative to the main frame 102. The third rank 132 of row units 124 is coupled to the third tool bar 134. In the illustrative embodiment, the third rank 132 of row units 124 is arranged forward of the second rank 122 of row units 124. In the illustrative embodiment, the right and left side of the implement 300 are the same such that description of one side is equally applicable to the other side of the implement 300. The same is true for each implement described herein unless otherwise stated.

Figure 4A:
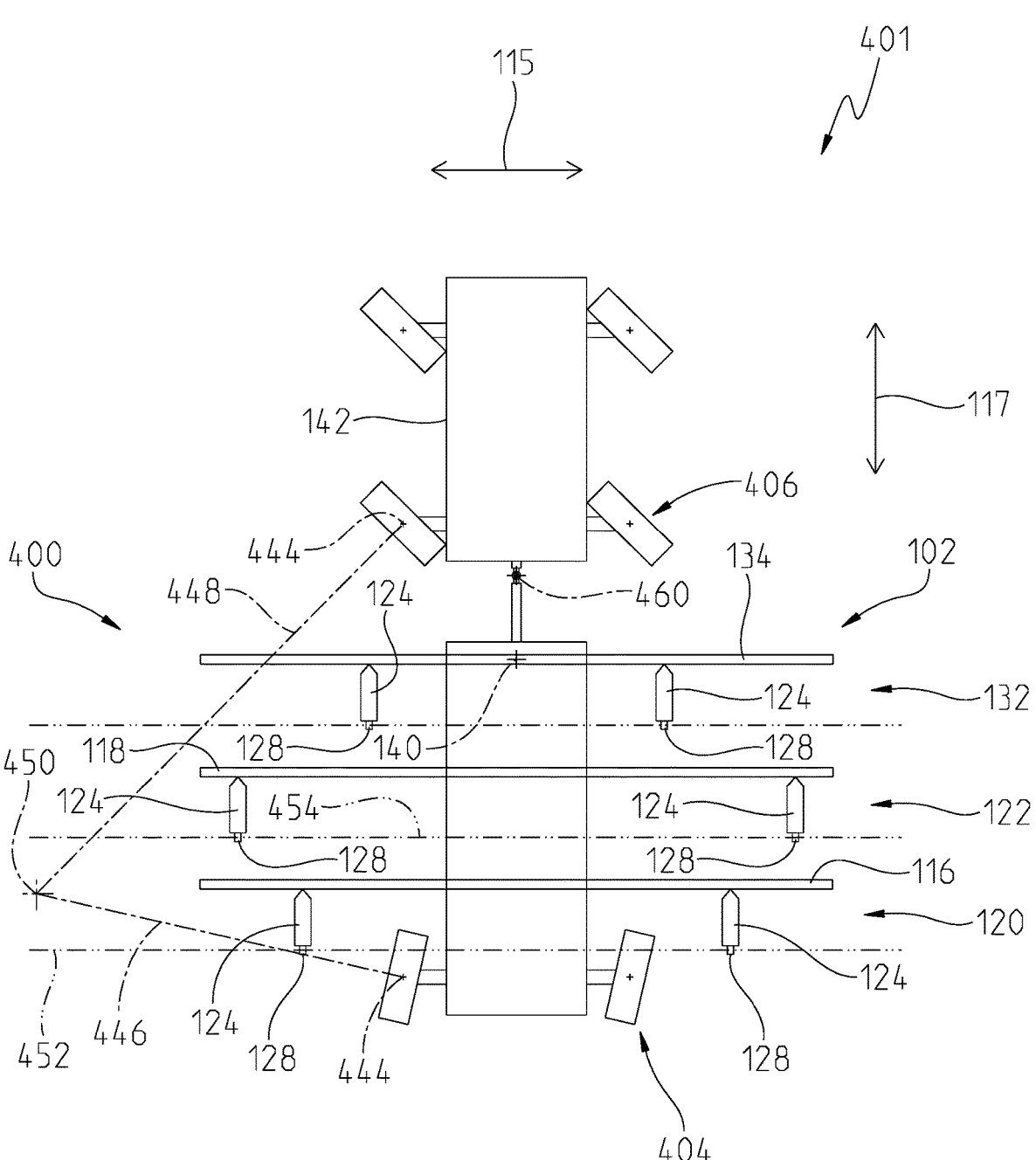
FIG. 4A is diagrammatic view of a tractor pivotably coupled to an implement having first and second tool bars with first and second ranks of row units coupled respectively thereto, and showing forward and rearward wheels that are independently steerable.

Referring now to FIG. 4A, a planting system 401 is shown. The planting system 401 includes a tractor 142 and an implement 400 pivotably coupled to the tractor 142 (e.g., by the tongue 110 and latch 112 components) such that the implement 400 is configured for pivoting motion relative to the tractor 142 about a pivot axis 460. The planting system 401 includes a first pair of wheels 404 and a second pair of wheels 406 that are each steerable. In the illustrative embodiment, the second pair of wheels 406 is included in the tractor 142, and the first pair of wheel 404 is included in the implement 400. The wheels 404, 406 are oppositely steerable such that the first pair of wheels 404 is configured to pivot in a first direction while the second pair of wheels 406 pivots in a second direction opposite the first direction. This opposite pivoting motion of the wheels 404, 406 during forward travel of the planting system 401 causes the implement 400 to turn about a turning center axis 450. In some embodiments, the wheels 406 are actively steerable, and the wheels 404 are passively steerable (i.e., synced to the wheels 406) such that the wheels 404 pivot simultaneously with and the same degree as the wheels 406, albeit in the opposite direction. While it is generally known that to pivot about a center point (or about a line in three dimensions) means to move along a curve where each point on the curve is equidistant from the center point or line, it should be appreciated that the term pivot about as used herein includes movement around the center point or line that deviates a trivial distance from the equidistant curve due to uneven ground, or wear and tear of the implement, operator error or discretion, field conditions, and other factors.

In the illustrative embodiment, each wheel of the pairs 404, 406 includes a radial center point 444 located at the center of each wheel hub such that the radial center point 444 of each wheel is aligned with a respective axle of the wheel. In the illustrative embodiment, as the implement 400 turns about the turning center axis 450, wheel-intersection lines 446, 448 are defined, as shown in FIG. 4A. Each wheel intersection line 446, 448 passes through the radial center point 444 of the respective wheel and through the turning center axis 450. Based on the disclosure above, a trivial distance of deviation is contemplated for intersection lines described as passing through the radial center point. During a turning operation of the implement 400, each wheel intersection line 446, 448 is perpendicular to the wheel that it intersects. In other words, a cross-section plane formed through a circumference of each wheel is perpendicular to the wheel intersection line that passes through the respective wheel, when viewed in a top-down diagrammatic view, as shown in FIG. 4A.

In the illustrative embodiment, the implement 400 includes the main frame 102 and the plurality of row units 124 indirectly coupled to the main frame 102. The implement 400 also includes the first tool bar 116 and the second tool bar 118, each fixedly coupled to the main frame 102 and extending in the lateral direction 115. The first rank 120 of row units 124 is coupled to the first tool bar 116, and the second rank 122 of row units 124 is coupled to the second tool bar 118. In the illustrative embodiment, the implement 400 includes the third tool bar 134, which is pivotably coupled to the main frame 102 at the pivot axis 140, with the third rank 132 of row units 124 being coupled to the third tool bar 134. In the illustrative embodiment, the third rank 132 of row units 124 is arranged forward of the second rank 122 of row units 124. In the illustrative embodiment, the first and second tool bars 116, 118 are positioned between the first and second pairs of wheels 404, 406 in the forward-aft direction 117.

The row units 124 of the ranks 120, 122 each include furrow openers 128 configured to contact the ground along a laterally extending contact line. For example, the furrow openers 128 of the first rank 120 of row units 124 are configured to contact the ground along a first contact line 452, and the furrow openers 128 of the second rank 122 of row units 124 are configured to contact the ground along a second contact line 454. In the illustrative embodiment, the first contact line 452 is substantially parallel to the first tool bar 116, and the second contact line 454 is substantially parallel to the second tool bar 118. The first contact line 452 and the second contact line 454 are spaced apart equally from the turning center axis 450 as the implement 400 turns about the turning center axis 450. In the illustrative embodiment, the first and second contact lines 452, 454 are positioned between the first and second pairs of wheels 404, 406 in the forward-aft direction 117.

Figure 4B:
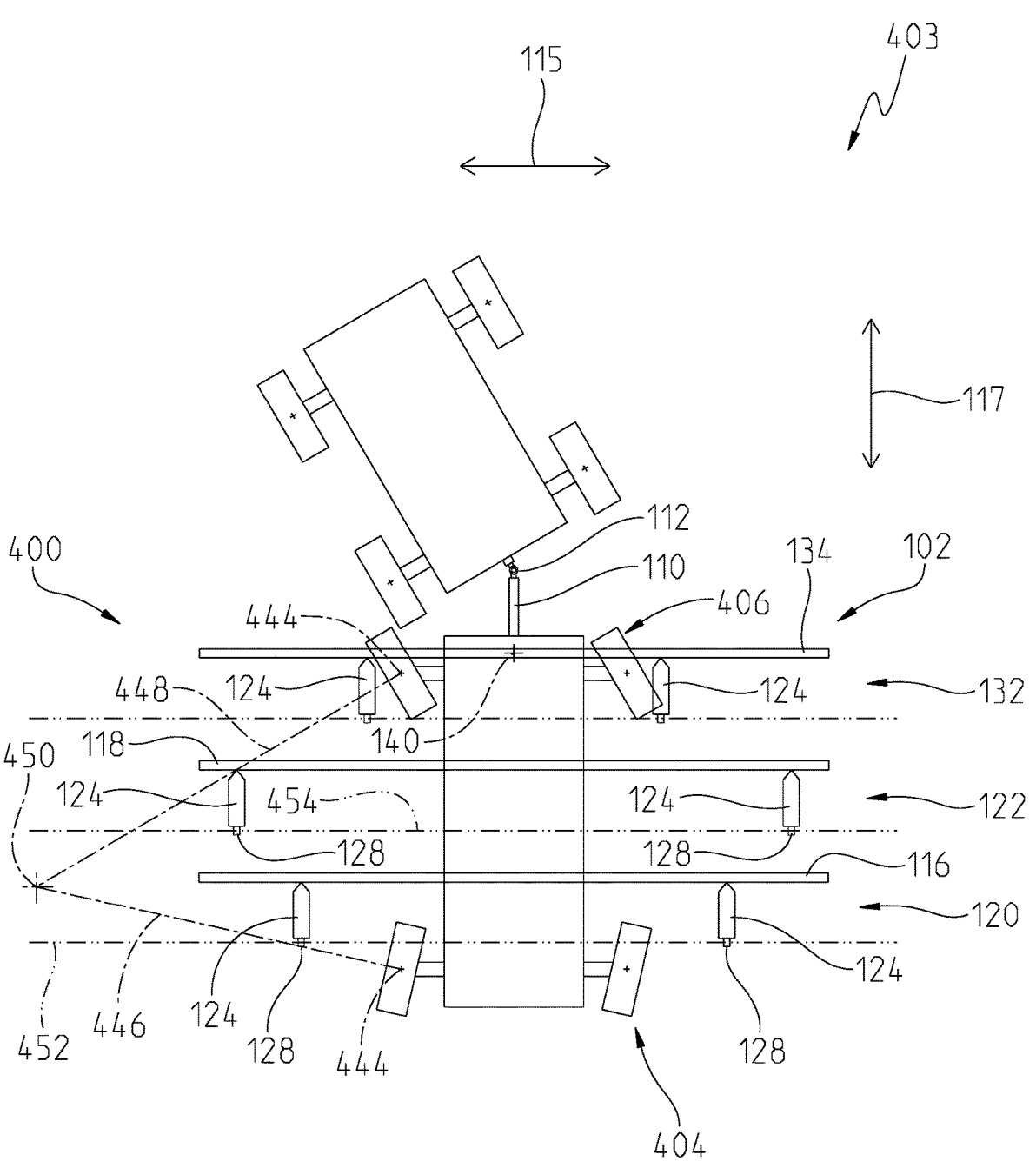
FIG. 4B is a diagrammatic view similar to FIG. 4A, except that the forward wheels are included in an implement rather than a tractor.

Referring now to FIG. 4B, a planting system 403 is shown. The planting system 403 includes the implement 400, which is configured to be pivotably coupled to a work machine, e.g., by the tongue 110 and latch 112 components. The planting system 403 similar to the planting system 401, except that in the planting system 403, the second pair of wheels 406 is included in the implement 400 (along with the first pair of wheels 404). To that point, the second pair of wheels 406 is coupled to the main frame 102 of the implement 400 and pivotable relative thereto. As described with reference to the planting system 401, in the planting system 403, the wheels of the pairs 404, 406 are oppositely steerable such that the first pair of wheels 404 is configured to pivot in a first direction while the second pair of wheels 406 pivots in a second direction opposite the first direction, which causes the implement 400 to turn about the turning center axis 450. In some embodiments, a first pair of wheels (i.e., 404 or 406) is actively steerable, and the other pair of wheels is passively steerable (i.e., synced to pivot simultaneously with and the same degree as the first pair of wheels, albeit in the opposite direction).

Figure 5A:
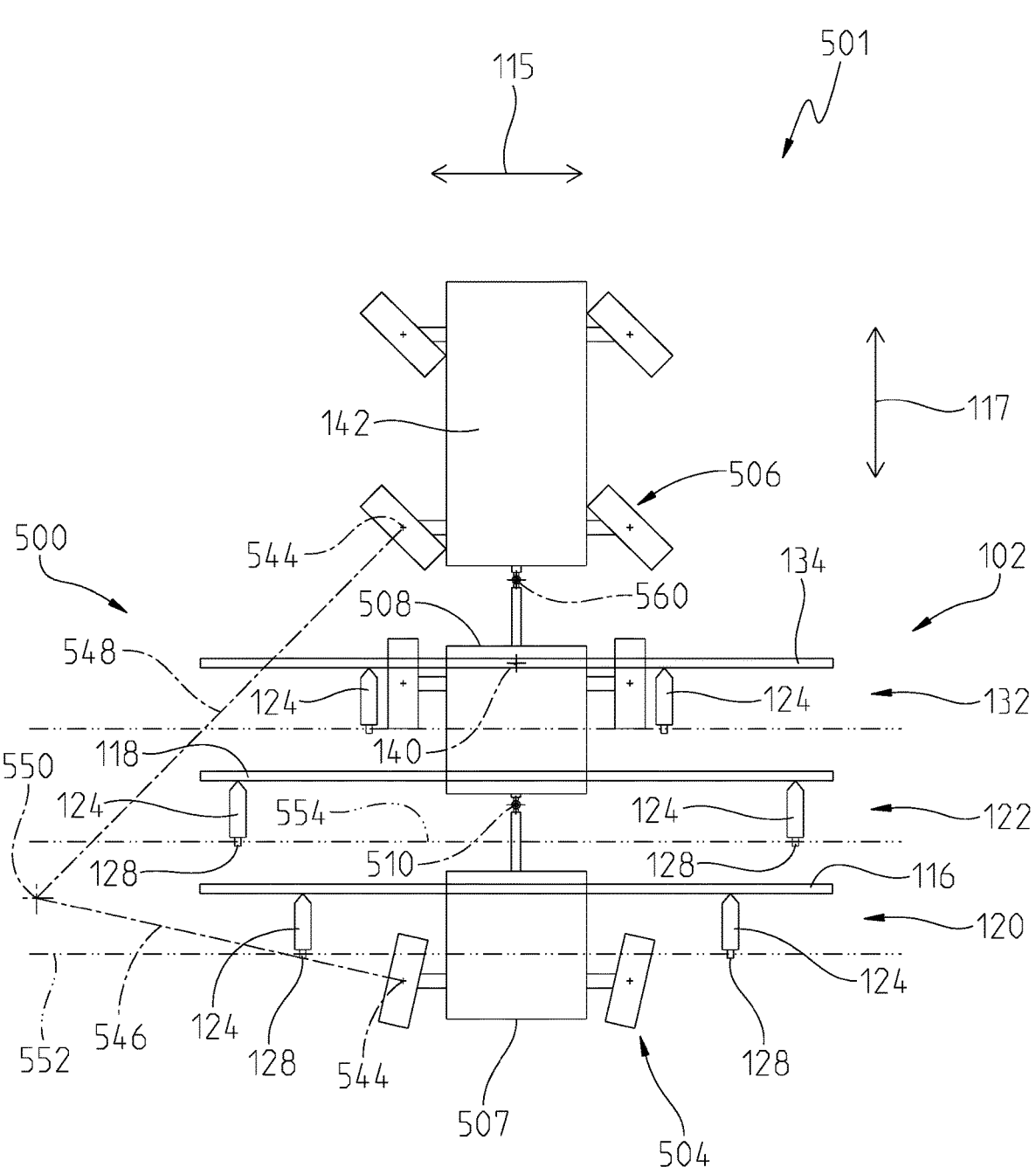
FIG. 5A is a diagrammatic view similar to FIG. 4A, except that the main frame of the implement includes a first portion and a second portion pivotably coupled to the first portion.

Referring now to FIG. 5A, a planting system 501 is shown. The planting system 501 includes a tractor 142 and an implement 500 pivotably coupled to the tractor 142 (e.g., by the tongue 110 and latch 112 components) such that the implement 500 is configured for pivoting motion relative to the tractor 142 about a pivot axis 560. The planting system 501 includes a first pair of wheels 504 and a second pair of wheels 506 that are each steerable. In the illustrative embodiment, the second pair of wheels 506 is included in the tractor 142, and the first pair of wheels 504 is included in the implement 500. The wheels 504, 506 are oppositely steerable such that the first pair of wheels 504 is configured to pivot in a first direction while the second pair of wheels 506 pivots in a second direction opposite the first direction. This opposite pivoting motion of the wheels 504, 506 during forward travel of the planting system 501 causes the implement 500 to turn about a turning center axis 550. In some embodiments, the wheels 506 are actively steerable, and the wheels 504 are passively steerable (i.e., synced to the wheels 506) such that the wheels 504 pivot simultaneously with and the same degree as the wheels 506, albeit in the opposite direction.

In the illustrative embodiment, each wheel includes a radial center point 544 located at the center of each wheel hub such that the radial center point 544 of each wheel is aligned with a respective axle of the wheel. In the illustrative embodiment, as the implement 500 turns about the turning center axis 550, wheel-intersection lines 546, 548 are defined, as shown in FIG. 5A. Each wheel intersection line 546, 548 passes through the radial center point 544 of the respective wheel and through the turning center axis 550. During a turning operation of the implement 500, each wheel intersection line 546, 548 is perpendicular to the wheel that it intersects. In other words, a cross-sectional plane formed through a circumference of each wheel is perpendicular to the wheel intersection line that passes through the respective wheel, when viewed in a top-down diagrammatic view, as shown in FIG. 5A.

In the illustrative embodiment, the implement 500 includes the main frame 102 and the plurality of row units 124 indirectly coupled to the main frame 102. The implement 500 also includes the first tool bar 116 and the second tool bar 118, each fixedly coupled to the main frame 102 and extending in the lateral direction 115. The first rank 120 of row units 124 is coupled to the first tool bar 116, and the second rank 122 of row units 124 is coupled to the second tool bar 118. In the illustrative embodiment, the implement 500 includes the third tool bar 134, which is pivotably coupled to the main frame 102 at the pivot axis 140, with the third rank 132 of row units 124 being coupled to the third tool bar 134. In the illustrative embodiment, the third rank 132 of row units 124 is arranged forward of the second rank 122 of row units 124. In the illustrative embodiment, the first and second tool bars 116, 118 are positioned between the first and second pairs of wheels 504, 506 in the forward-aft direction 117.

The furrow openers 128 of the first rank 120 of row units 124 are configured to contact the ground along a first contact line 552, and the furrow openers 128 of the second rank 122 of row units 124 are configured to contact the ground along a second contact line 554. In the illustrative embodiment, the first contact line 552 is substantially parallel to the first tool bar 116, and the second contact line 554 is substantially parallel to the second tool bar 118. The first contact line 552 and the second contact line 554 are spaced apart equally from the turning center axis 550 as the implement 500 turns about the turning center axis 550. In the illustrative embodiment, the first and second contact lines 552, 554 are positioned between the first and second pairs of wheels 504, 506 in the forward-aft direction 117.

Referring still to FIG. 5A, the main frame 102 of the implement 500 includes a first portion 507 and second portion 508 that is pivotably coupled to the first portion 507 (e.g., by tongue 110 and latch 112 components). In the illustrative embodiment, the second portion 508 is positioned forward of the first portion 507. In the illustrative embodiment, the first portion 507 is pivotable relative to the second portion 508 about a pivot axis 510. In the illustrative embodiment, the first rank 120 of row units 124 is coupled to the first tool bar 116, which is coupled to the first portion 507 of the main frame 102, and the second rank 122 of row units 124 is coupled to the second tool bar 118, which is coupled to the second portion 508 of the main frame 102. In some embodiments, the pivot axis 510 is equidistant from the first contact line 552 and the second contact line 554 during the turning operation of the implement 500. Additionally, in the illustrative embodiment, the third rank 132 of row units 124 is coupled to the second portion 508 of the main frame 102.

Figure 5B:
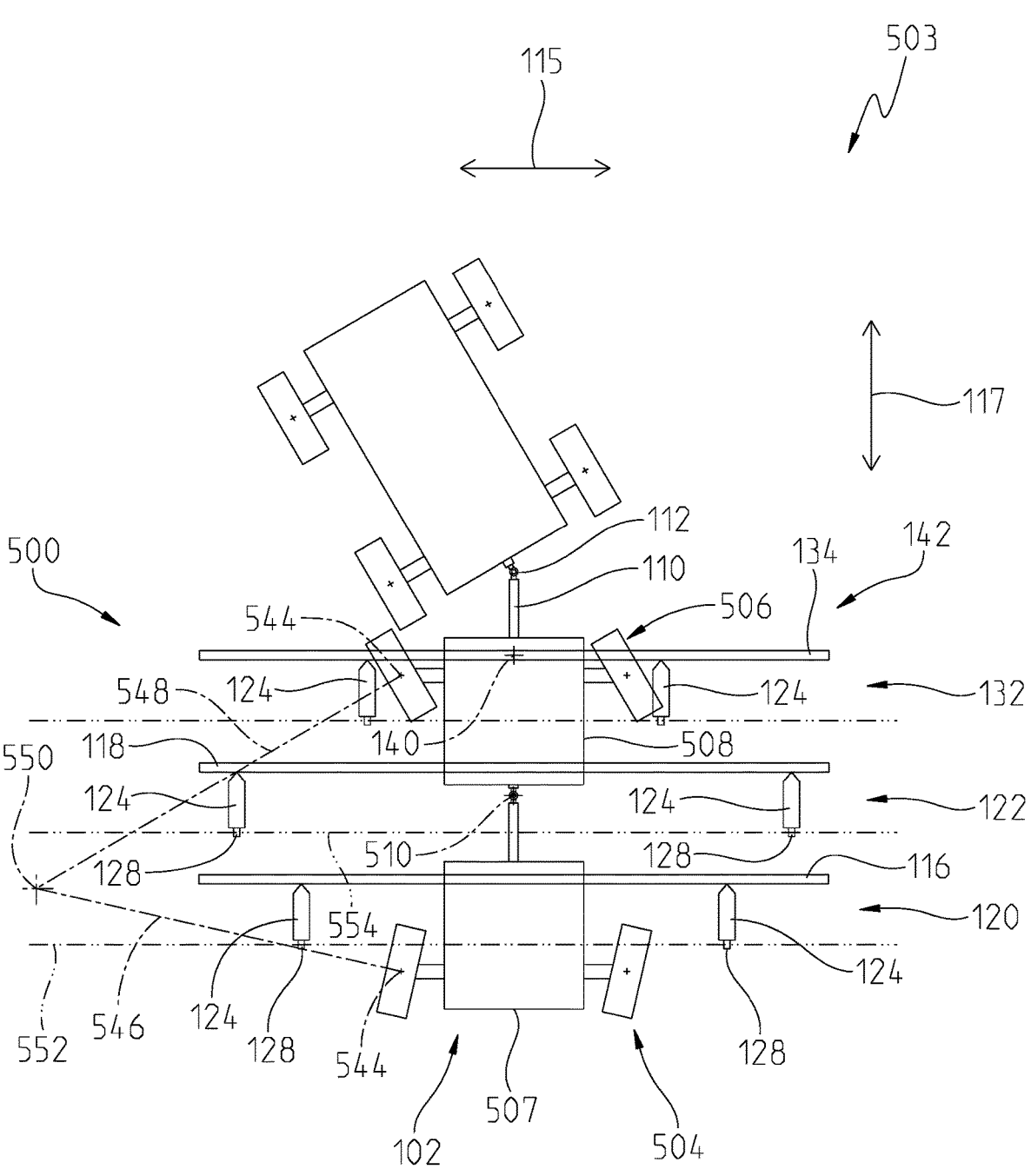
FIG. 5B is a diagrammatic view similar to FIG. 5A, except that the forward wheels are included in an implement rather than a tractor.

Referring now to FIG. 5B, a planting system 503 is shown. The planting system 503 includes the implement 500, which is configured to be pivotably coupled to a work machine, e.g., by the tongue 110 and latch 112 components. The planting system 503 is similar to the planting system 501, except that in the planting system 503, the second pair of wheels 506 is included in the implement 500 (along with the first pair of wheels 504). To that point, the second pair of wheels 506 is coupled to the main frame 102 of the implement 500 and pivotable relative thereto. As described with reference to the planting system 501, in the planting system 503, the wheels 504, 506 are oppositely steerable such that the first pair of wheels 504 is configured to pivot in a first direction while the second pair of wheels 506 pivots in a second direction opposite the first direction, which causes the implement 500 to turn about the turning center axis 550. In some embodiments, a first pair of wheels (i.e., 504 or 506) is actively steerable, and the other pair of wheels is passively steerable (i.e., synced to pivot simultaneously with and the same degree as the first pair of wheels, albeit in the opposite direction).

Figure 6A:
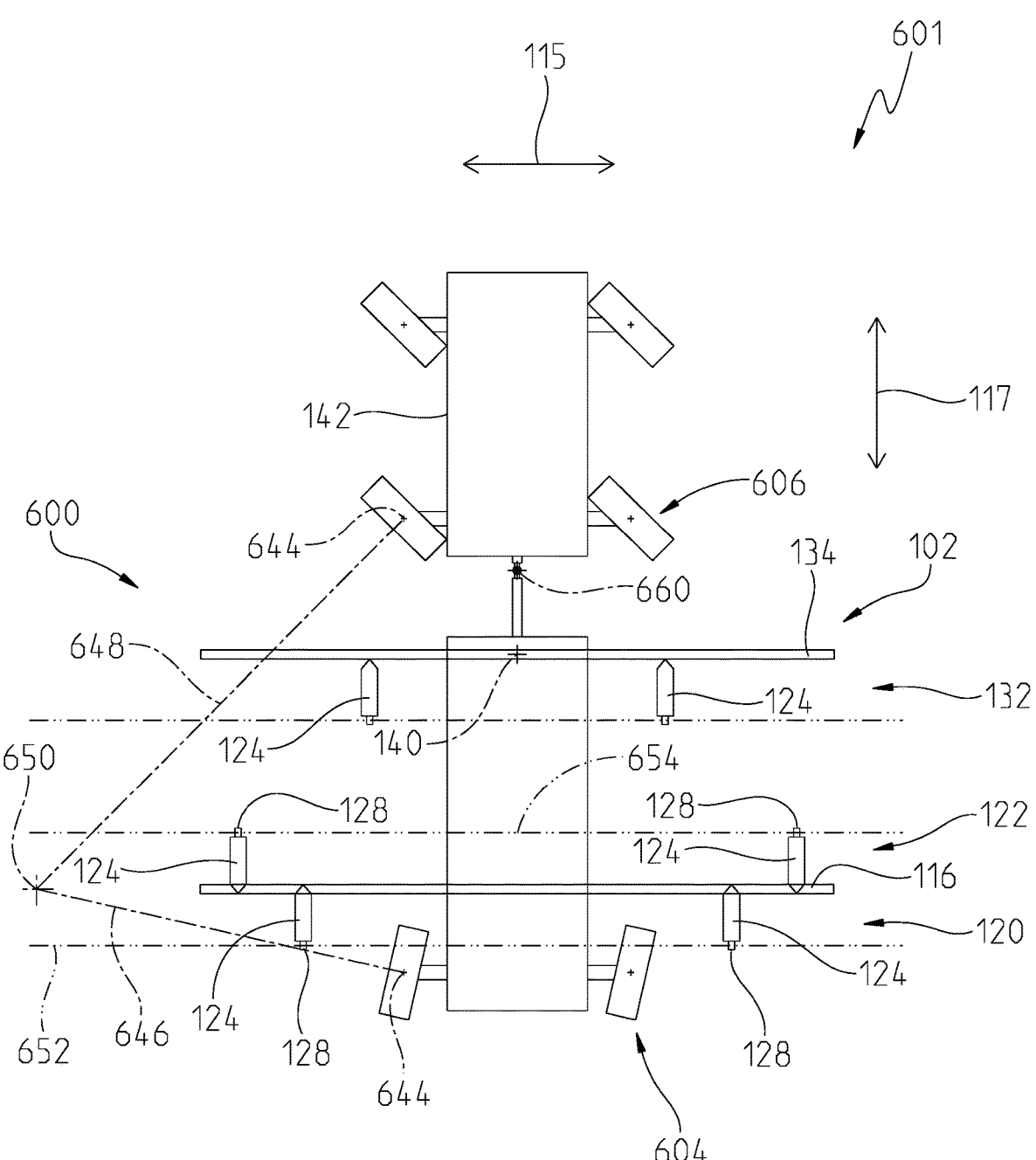
FIG. 6A is a diagrammatic view similar to FIG. 4A, except that the first and second ranks of row units are coupled to a single tool bar.

Referring now to FIG. 6A, a planting system 601 is shown. The planting system 601 includes a tractor 142 and an implement 600 pivotably coupled to the tractor 142 (e.g., by the tongue 110 and latch 112 components) such that the implement 600 is configured for pivoting motion relative to the tractor 142 about a pivot axis 660. The planting system 601 includes a first pair of wheels 604 and a second pair of wheels 606 that are each steerable. In the illustrative embodiment, the second pair of wheels 606 is included in the tractor 142, and the first pair of wheel 604 is included in the implement 600. The wheels 604, 606 are oppositely steerable such that the first pair of wheels 604 is configured to pivot in a first direction while the second pair of wheels 606 pivots in a second direction opposite the first direction. This opposite pivoting motion of the wheels 604, 606 during forward travel of the planting system 601 causes the implement 600 to turn about a turning center axis 650. In some embodiments, the wheels 606 are actively steerable, and the wheels 604 are passively steerable (i.e., synced to the wheels 606) such that the wheels 604 pivot simultaneously with and the same degree as the wheels 606, albeit in the opposite direction.

In the illustrative embodiment, each wheel of the pairs 604, 606 includes a radial center point 644 located at the center of each wheel hub such that the radial center point 644 of each wheel is aligned with a respective axle of the wheel. In the illustrative embodiment, as the implement 600 turns about the turning center axis 650, wheel-intersection lines 646, 648 are defined, as shown in FIG. 6A. Each wheel intersection line 646, 648 passes through the radial center point 644 of the respective wheel 604, 606 and through the turning center axis 650. During a turning operation of the implement 600, each wheel intersection line 646, 648 is perpendicular to the wheel that it intersects. In other words, a cross-section plane formed through a circumference of each wheel is perpendicular to the wheel intersection line that passes through the respective wheel, when viewed in a top-down diagrammatic view, as shown in FIG. 6A.

In the illustrative embodiment, the implement 600 includes the main frame 102 and the plurality of row units 124 indirectly coupled to the main frame 102. The implement 600 also includes the first tool bar 116, which is fixedly coupled to the main frame 102 and extends in the lateral direction 115. The first rank 120 of row units 124 is coupled to the first tool bar 116, and the second rank 122 of row units 124 is coupled to the first tool bar 116 as well. In this embodiment, the first rank 120 may be a pulled rank of row units, and the second rank 122 may be a pushed rank of row units. In the illustrative embodiment, the implement 600 includes the tool bar 134, which is pivotably coupled to the main frame 102 at the pivot axis 140, with the third rank 132 of row units 124 being coupled to the tool bar 134. In the illustrative embodiment, the third rank 132 of row units 124 is arranged forward of the second rank 122 of row units 124. In the illustrative embodiment, the first tool bar 116 is positioned between the first and second pairs of wheels 604, 606 in the forward-aft direction 117.

The furrow openers 128 of the first rank 120 of row units 124 are configured to contact the ground along a first contact line 652, and the furrow openers 128 of the second rank 122 of row units 124 are configured to contact the ground along a second contact line 654. In the illustrative embodiment, the first contact line 652 is substantially parallel to the first tool bar 116, and the second contact line 654 is also substantially parallel to the first tool bar 116. The first contact line 652 and the second contact line 654 are spaced apart equally from the turning center axis 650 as the implement 600 turns about the turning center axis 650. In the illustrative embodiment, the first and second contact lines 652, 654 are positioned between the first and second pairs of wheels 604, 606 in the forward-aft direction 117.

Figure 6B:
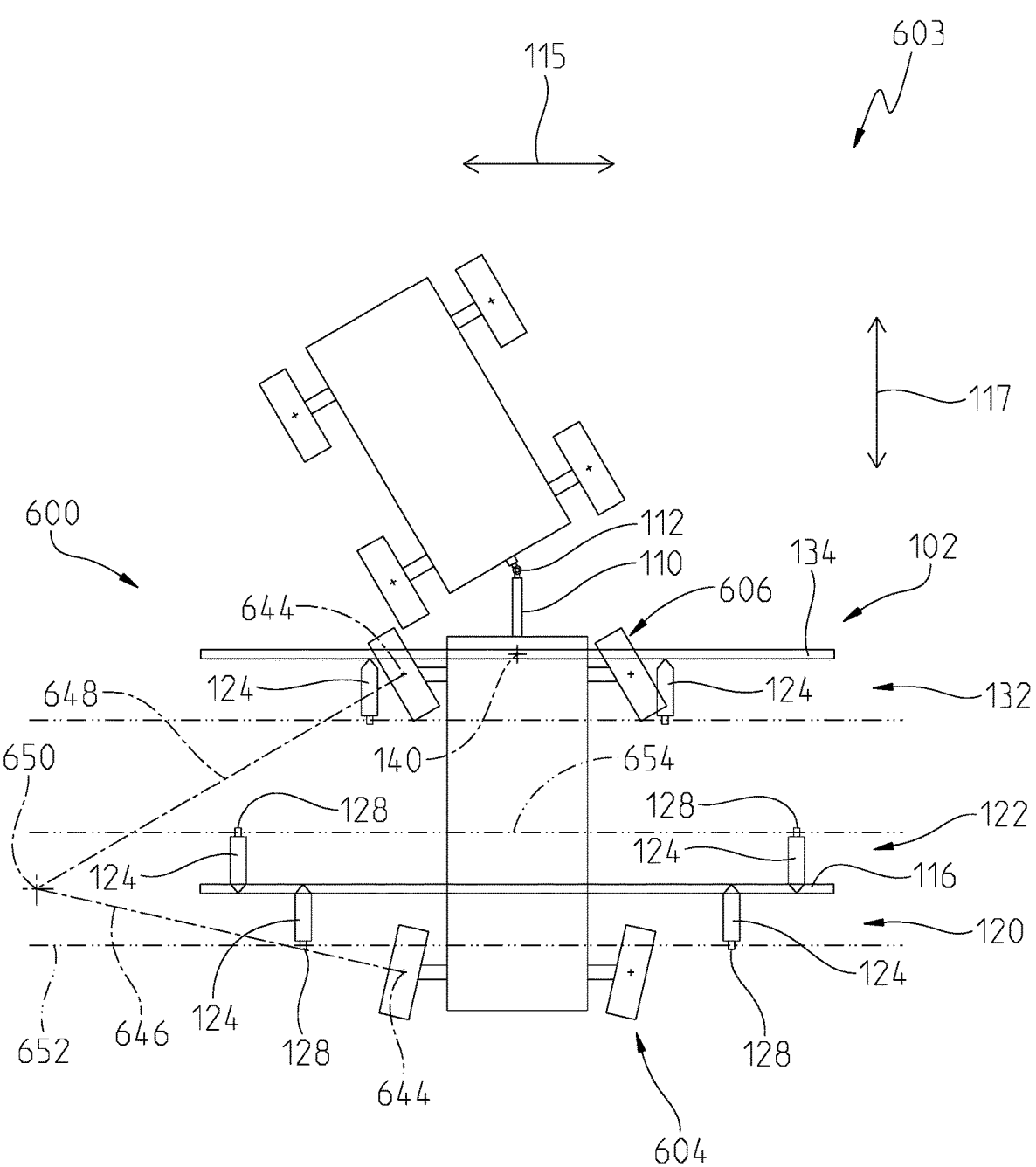
FIG. 6B is a diagrammatic view similar to FIG. 6A, except that the forward wheels are included in an implement rather than a tractor.

Referring now to FIG. 6B, a planting system 603 is shown. The planting system 603 includes the implement 600, which is configured to be pivotably coupled to a work machine, e.g., by the tongue 110 and latch 112 components. The planting system 603 is similar to the planting system 601, except that in the planting system 603, the second pair of wheels 606 is included in the implement 600 (along with the first pair of wheels 604). To that point, the second pair of wheels 606 is coupled to the main frame 102 of the implement 600 and pivotable relative thereto. As described with reference to the planting system 601, in the planting system 603, the wheels 604, 606 are oppositely steerable such that the first pair of wheels 604 is configured to pivot in a first direction while the second pair of wheels 606 pivots in a second direction opposite the first direction, which causes the implement 600 to turn about the turning center axis 650. In some embodiments, a first pair of wheels (i.e., 604 or 606) is actively steerable, and the other pair of wheels is passively steerable (i.e., synced to pivot simultaneously with and the same degree as the first pair of wheels, albeit in the opposite direction).

Figure 7:
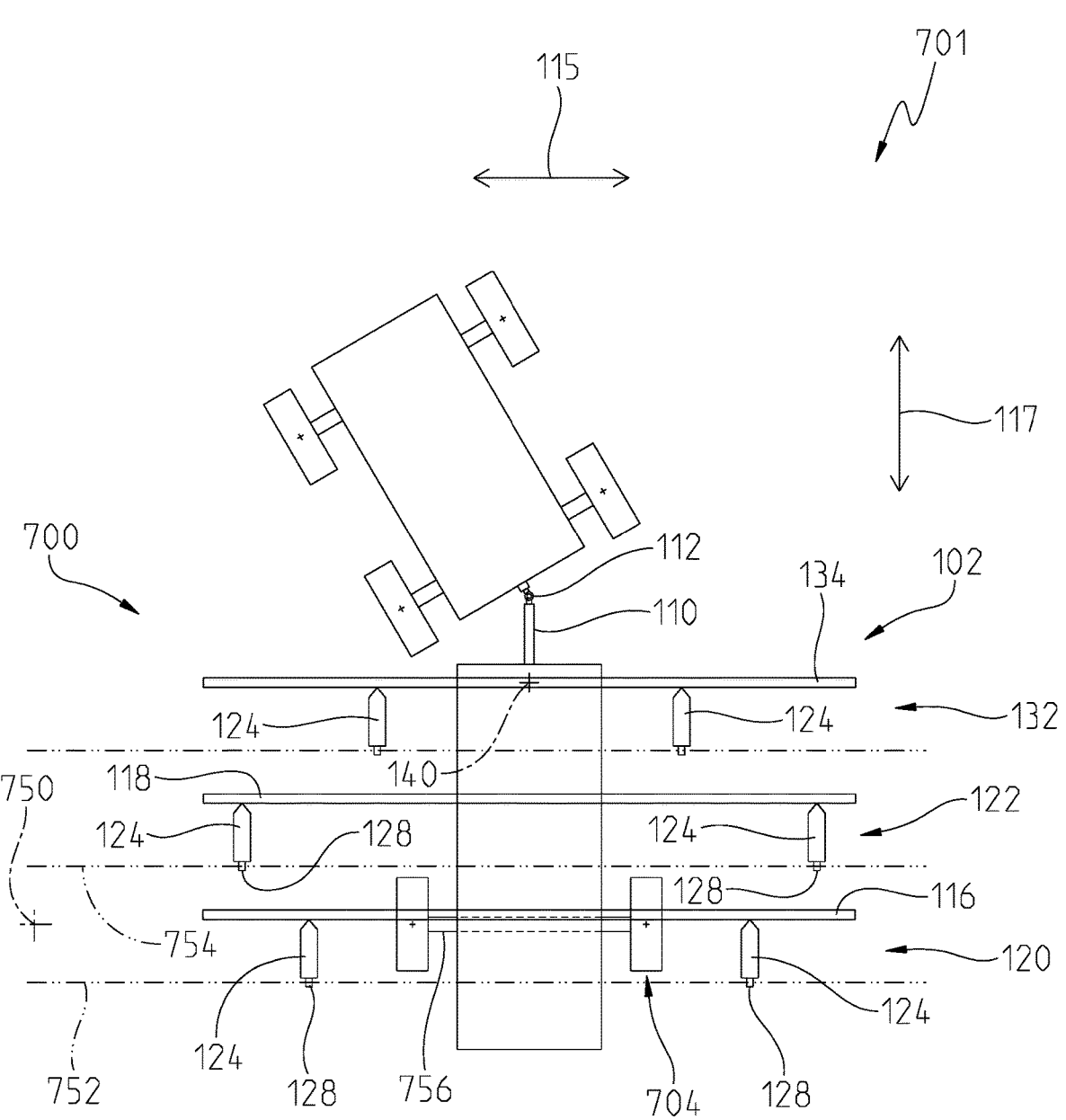
FIG. 7 is a diagrammatic view of an implement having non-steerable rearward wheels and having first and second tool bars with first and second ranks of row units coupled respectively thereto, where lines of furrow openers of row units of the first and second ranks are spaced equidistant from an axle of the rear wheels.

Referring now to FIG. 7, a planting system 701 is shown. The planting system 701 includes an implement 700 configured to be pivotably coupled to a work machine, e.g., by the tongue 110 and latch 112 components. The implement 700 includes a first pair of wheels 704 coupled to the main frame 102. The planting system 701 also includes a second pair of wheels 706 that may be coupled to the work machine or to the main frame 102. In the illustrative embodiment, the first pair of wheels 704 is not steerable, and as such, the first pair of wheels 704 is configured pivot relative to the main frame 102 to follow a moving work machine during forward travel.

In the illustrative embodiment, the implement 700 includes the main frame 102 and the plurality of row units 124 indirectly coupled to the main frame 102. The implement 700 also includes the first tool bar 116 and the second tool bar 118, each fixedly coupled to the main frame 102 and extending in the lateral direction 115. The first rank 120 of row units 124 is coupled to the first tool bar 116, and the second rank 122 of row units 124 is coupled to the second tool bar 118. In the illustrative embodiment, the implement 700 includes the third tool bar 134, which is pivotably coupled to the main frame 102 at the pivot axis 140, with the third rank 132 of row units 124 being coupled to the third tool bar 134. In the illustrative embodiment, the third rank 132 of row units 124 is arranged forward of the second rank 122 of row units 124.

As shown in FIG. 7, the furrow openers 128 of the first rank 120 of row units 124 are configured to contact the ground along a first contact line 752, and the furrow openers 128 of the second rank 122 of row units 124 are configured to contact the ground along a second contact line 754. In the illustrative embodiment, the first contact line 752 is substantially parallel to the first tool bar 116, and the second contact line 754 is substantially parallel to the second tool bar 118. The first contact line 752 and the second contact line 754 are spaced apart equally from a turning center axis 750 as the implement 700 turns about the turning center axis 750. Additionally, in the illustrative embodiment, the first and second contact lines 752, 754 are spaced apart equally from an axle 756 extend between and coupled to each wheel of the first pair of wheels 704. Specifically, the first and second contact lines 752, 754 are equidistant from and substantially parallel to a longitudinal axis defined through a radial center of the axle 756.

Figure 8:
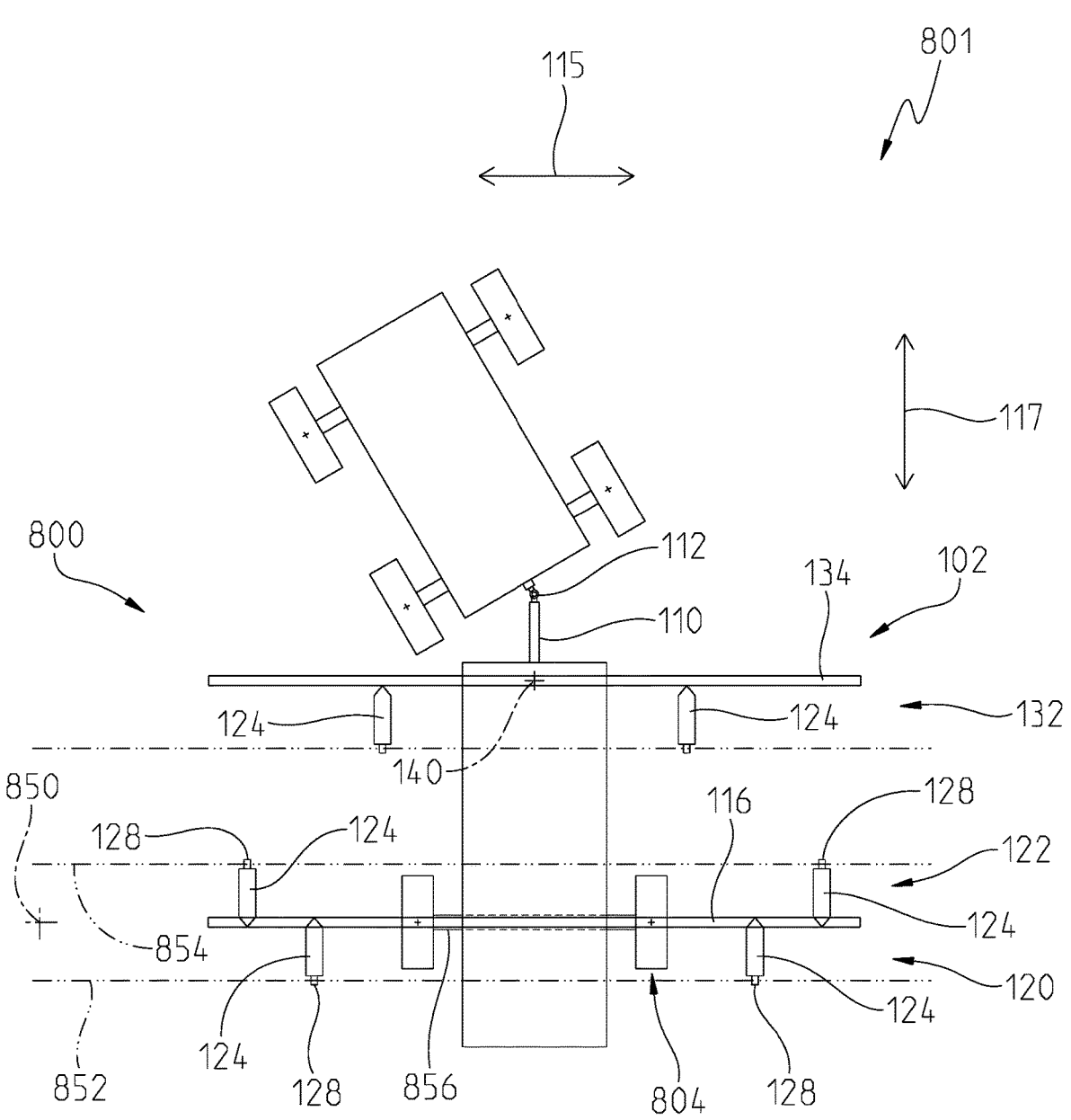
FIG. 8 is a diagrammatic view similar to FIG. 7, except that the first and second ranks of row units are coupled to a single tool bar.

Referring now to FIG. 8, a planting system 801 is shown. The planting system 801 includes an implement 800 configured to be pivotably coupled to a work machine, e.g., by the tongue 110 and latch 112 components. The implement 800 includes a first pair of wheels 804 coupled to the main frame 102. The planting system 801 also includes a second pair of wheels 806 that may be coupled to the work machine or to the main frame 102. In the illustrative embodiment, the first pair of wheels 804 is not steerable, and as such, the first pair of wheels 804 is configured pivot relative to the main frame 102 to follow a moving work machine during forward travel.

In the illustrative embodiment, the implement 800 includes the main frame 102 and the plurality of row units 124 indirectly coupled to the main frame 102. The implement 800 also includes the first tool bar 116, which is fixedly coupled to the main frame 102 and extends in the lateral direction 115. The first rank 120 of row units 124 is coupled to the first tool bar 116, and the second rank 122 of row units 124 is coupled to the first tool bar 116 as well. In this embodiment, the first rank 120 may be a pulled rank of row units, and the second rank 122 may be a pushed rank of row units. In the illustrative embodiment, the implement 800 includes the third tool bar 134, which is pivotably coupled to the main frame 102 at the pivot axis 140, with the third rank 132 of row units 124 being coupled to the third tool bar 134. In the illustrative embodiment, the third rank 132 of row units 124 is arranged forward of the second rank 122 of row units 124.

As shown in FIG. 8, the furrow openers 128 of the first rank 120 of row units 124 are configured to contact the ground along a first contact line 852, and the furrow openers 128 of the second rank 122 of row units 124 are configured to contact the ground along a second contact line 854. In the illustrative embodiment, the first contact line 852 and second contact line 854 are each substantially parallel to the first tool bar 116. The first and second contact lines 852, 854 are spaced apart equally from a turning center axis 850 as the implement 800 turns about the turning center axis 850. Additionally, in the illustrative embodiment, the first and second contact lines 852, 854 are spaced apart equally from an axle 856 extend between and coupled to each wheel of the first pair of wheels 804. Specifically, the first and second contact lines 852, 854 are equidistant from and substantially parallel to a longitudinal axis defined through a radial center of the axle 856.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. An agricultural planting system, comprising:

an implement configured to turn about a turning center axis during forward travel of the planting system, the implement including: (i) a main frame and (ii) a plurality of row units each having a furrow opener configured to contact the ground;

a first pair of wheels configured to support the main frame above the ground and a second pair of wheels positioned forward of the first pair of wheels;

wherein the plurality of row units includes a first rank of row units and a second rank of row units arranged forward of the first rank of row units;

wherein the furrow openers of the first rank of row units are configured to contact the ground along a first contact line;

wherein the furrow openers of the second rank of row units are configured to contact the ground along a second contact line;

wherein the first contact line and the second contact line each extend substantially parallel to at least one tool bar of the implement, the at least one tool bar fixedly coupled to the main frame; and wherein the first contact line and the second contact line are spaced apart equally from the turning center axis as the implement turns about the turning center axis.

2. The agricultural planting system of claim 1, wherein the implement includes at least one additional tool bar that is pivotably coupled to the main frame; and wherein the plurality of row units includes a third rank of row units coupled to the at least one additional tool bar.

3. The agricultural planting system of claim 1, wherein the first pair of wheels and the second pair of wheels are each steerable such that the first pair of wheels is configured to pivot in a first direction while the second pair of wheels pivots in a second direction opposite the first direction to cause the implement to turn about the turning center axis.

4. The agricultural planting system of claim 1, wherein each wheel of the first pair of wheels and each wheel of the second pair of wheels includes a radial center point; and wherein, as the implement turns about the turning center axis, wheel-intersection lines are defined, which each:
(i) pass through the radial center point of a respective wheel and through the turning center axis and (ii) extend perpendicular to a cross section taken along a circumference of the respective wheel.

5. The agricultural planting system of claim 3, further comprising a tractor coupled to the implement and pivotable relative to the main frame of the implement;

wherein the tractor includes the second pair of wheels and the implement includes the first pair of wheels.

6. The agricultural planting system of claim 3, further comprising a tractor coupled to the implement and pivotable relative to the main frame of the implement;

wherein the implement includes the first pair of wheels and the second pair of wheels.

7. The agricultural planting system of claim 3, wherein the at least one tool bar includes a first tool bar and a second tool bar;

wherein the first rank of row units is coupled to the first tool bar; and wherein the second rank of row units is coupled to the second tool bar.

8. The agricultural planting system of claim 7, wherein the main frame includes:

a rearward portion to which the first tool bar is fixedly coupled;

a forward portion to which the second tool bar is fixedly coupled; and wherein the forward portion of the main frame is pivotable relative to the rearward portion of the main frame.

9. The agricultural planting system of claim 7, wherein the implement includes a third tool bar that is pivotably coupled to the main frame; and wherein the plurality of row units includes a third rank of row units coupled to the third tool bar.

10. The agricultural planting system of claim 7, wherein first tool bar and the second tool bar are each positioned between the first pair of wheels and the second pairs of wheel in a forward-aft direction.

11. The agricultural planting system of claim 3, wherein the at least one tool bar includes a first tool bar; and wherein the first rank of row units and the second rank of row units are each coupled to the first tool bar.

12. The agricultural planting system of claim 11, wherein the implement includes a second tool bar that is pivotable relative to the main frame; and wherein the plurality of row units includes a third rank of row units coupled to the second tool bar.

13. The agricultural planting system of claim 11, wherein the first tool bar is positioned between the first pair of wheels and the second pair of wheels in the forward-aft direction.

14. The agricultural planting system of claim 1, wherein, as the implement turns about the turning center axis, the first contact line and the second contact line are equidistant from a longitudinal axis defined through a radial center of an axle to which the first pair of wheels is rotatably coupled.

15. The agricultural planting system of claim 14, wherein the at least one tool bar includes a first tool bar and a second tool bar;

wherein the first rank of row units is coupled to the first tool bar; and wherein the second rank of row units is coupled to the second tool bar.

16. The agricultural planting system of claim 14, wherein the at least one tool bar includes a first tool bar; and wherein the first rank of row units and second rank of row units are each coupled to the first tool bar.

17. The agricultural planting system of claim 14, wherein the implement includes at least one additional tool bar that is pivotably coupled to the main frame; and wherein the plurality of row units includes a third rank of row units coupled to the at least one additional tool bar.

18. An implement configured to turn about a turning center axis during forward travel of the planting system, the implement including comprising:

a main frame comprising: (i) first portion having a first tool bar fixedly coupled thereto and (ii) a second portion arranged rearward of the first portion and having a second tool bar fixedly coupled thereto;

a first rank of row units coupled to the first tool bar and each having a furrow opener configured to contact the ground;

a second rank of row units coupled to the second tool bar and each having a furrow opener configured to contact the ground; and a forward pair of wheels coupled to the first portion of the main frame and a rearward pair of wheels coupled to the second portion of the main frame;

wherein the first portion of the main frame is pivotably coupled to the second portion of the main frame;

wherein the furrow openers of the first rank of row units are configured to contact the ground along a first contact line;

wherein the furrow openers of the second rank of row units are configured to contact the ground along a second contact line; and wherein the first contact line and the second contact line are spaced apart equally from the turning center axis as the implement turns about the turning center axis.

19. A method of turning an implement of a planting system about a turning center axis during forward travel of the planting system through a turn, the method comprising:

pivoting a first pair of wheels of the planting system in a first direction;

simultaneously to pivoting the first pair of wheels in the first direction, pivoting a second pair of wheels in a second direction opposite the first direction; and simultaneously to pivoting the first pair of wheels in the first direction, maintaining ground contact with a first rank of row units coupled to the main frame and a second rank of row units coupled to the main frame, the second rank arranged forward of the first rank;

wherein pivoting the second pair of wheels in a second direction opposite the first direction includes maintaining each of a first contact line and a second contact line equidistant from the turning center axis during a portion of the turn, the first contact line defined through ground engaging portions of the first rank of row units, and the second contact line defined through ground engaging portions of the second rank of row units.

* * * * *